United States Patent
Klimek et al.

(10) Patent No.: US 8,517,459 B2
(45) Date of Patent: Aug. 27, 2013

(54) BODY STRUCTURE OF A MOTOR VEHICLE, MOTOR VEHICLE AND METHOD OF MANUFACTURING A BODY STRUCTURE

(75) Inventors: Stanislaw Klimek, Frankfurt am Main (DE); Andreas Stern, Ehlscheid (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/215,540

(22) Filed: Aug. 23, 2011

(65) Prior Publication Data

US 2012/0049582 A1    Mar. 1, 2012

(30) Foreign Application Priority Data

Aug. 24, 2010  (DE) .................. 10 2010 035 212

(51) Int. Cl.
  *B62D 25/20*  (2006.01)
(52) U.S. Cl.
  USPC .................. 296/193.07; 296/204; 296/63
(58) Field of Classification Search
  USPC ............. 296/204, 193.07, 203.01, 203.03, 296/63
  See application file for complete search history.

(56) References Cited

U.S. PATENT DOCUMENTS

| | | | | |
|---|---|---|---|---|
| 5,129,700 A | * | 7/1992 | Trevisan et al. | 296/193.07 |
| 5,468,050 A | * | 11/1995 | Hall et al. | 297/344.1 |
| 6,655,729 B2 | * | 12/2003 | Neale | 296/193.07 |
| 7,434,871 B2 | * | 10/2008 | Mizuma et al. | 296/193.07 |
| 7,500,714 B2 | * | 3/2009 | Abe et al. | 296/193.07 |
| 8,052,205 B2 | * | 11/2011 | Matsuyama | 296/193.07 |
| 2004/0080188 A1 | * | 4/2004 | Igarashi et al. | 296/203.04 |
| 2005/0189791 A1 | * | 9/2005 | Chernoff et al. | 296/193.07 |
| 2008/0315629 A1 | | 12/2008 | Abe et al. | |
| 2009/0102238 A1 | | 4/2009 | Gomi | |
| 2009/0289476 A1 | * | 11/2009 | Bufe et al. | 296/204 |

FOREIGN PATENT DOCUMENTS

| | | |
|---|---|---|
| DE | 10305238 A1 | 8/2004 |
| DE | 102006052992 A1 | 5/2008 |
| DE | 102006052993 A1 | 5/2008 |
| DE | 102007021223 A1 | 11/2008 |
| EP | 1251061 A1 | 10/2002 |
| EP | 2006191 A1 | 12/2008 |
| GB | 2260296 A | 4/1993 |
| GB | 2304650 A | 3/1997 |

OTHER PUBLICATIONS

German Patent Office, German Search Report for Application No. 102010035212.8, dated Jul. 27, 2011.
British Patent Office, British Search Report for Application No. 1114388.0, dated Dec. 9, 2011.

* cited by examiner

*Primary Examiner* — Dennis Pedder
(74) *Attorney, Agent, or Firm* — Ingrassia Fisher & Lorenz, P.C.

(57) ABSTRACT

A body structure of a motor vehicle is provided that includes, but is not limited to a floor panel, that has an inner side directed toward the motor vehicle interior and an outer side directed toward the motor vehicle exterior, and also includes, but is not limited to a seat mounting for securing a motor vehicle seat. To reduce driving noise and air resistance, it is provided that on the outer side thereof, the floor panel is free from corrugations or stiffening structures running predominantly in the transverse direction of the motor vehicle. A motor vehicle is also provided having a corresponding body structure and a method is provided for the manufacture thereof.

18 Claims, 6 Drawing Sheets

BODY STRUCTURE OF A MOTOR VEHICLE, MOTOR VEHICLE AND METHOD OF MANUFACTURING A BODY STRUCTURE

CROSS-REFERENCE TO RELATED APPLICATION

This application claims priority to German Patent Application No. 102010035212.8, filed Aug. 24, 2010, which is incorporated herein by reference in its entirety.

TECHNICAL FIELD

The technical field relates to a body structure of a motor vehicle, a correspondingly fitted motor vehicle, and a method for manufacturing the body structure. The body structure comprises a floor panel that has an inner side directed toward the motor vehicle and an outer side directed toward the exterior of the motor vehicle, and is fitted with at least one seat mounting for securing a motor vehicle seat.

BACKGROUND

Body structures are known in the prior art. Body structures of this type must undertake a plurality of tasks. On the one hand, they seal the motor vehicle interior from the exterior. On the other hand, they are used for stiffening the body in order to ensure a smallest possible deformation in the passenger area in the event of the introduction of external forces. However, the body structures concerned must also satisfy further demands; in particular they must have the greatest possible noise absorbing effect and not cause any noise themselves.

Known from DE 10305238 A1 is a floor stiffening structure on motor vehicles, which comprises a floor panel terminating the passenger compartment of the motor vehicle toward the bottom, with at least one longitudinal bearer element fitted from below being associated with the floor panel, which extends into the upward-pointing structure of the heel plate and is connected to this and the floor panel. This structure can be disadvantageous in that it requires structures associated with an exterior side of the motor vehicle, pointing substantially in the transverse direction of the vehicle, which can lead to turbulence of the airstream. The air resistance of a correspondingly fitted vehicle is therefore increased. Furthermore, the turbulence of the airstream can cause vibrations and noise, which increase the noise level in particular in the vehicle interior. In addition, the vehicle interior is reduced in its size since the floor panel must be disposed relatively high while maintaining a predefined ground clearance.

It is therefore at least one object to further develop a motor vehicle structure of the type specified initially such that the available interior volume is enlarged and in particular, that the air resistance of the motor vehicle and the vehicle noise are reduced as far as possible. In addition, other objects, desirable features and characteristics will become apparent from the subsequent summary and detailed description, and the appended claims, taken in conjunction with the accompanying drawings and this background.

SUMMARY

A body structure of a motor vehicle according to an embodiment of the invention comprises a floor panel, which has an inner side directed toward the motor vehicle interior and an outer side directed toward the motor vehicle exterior. The floor panel thereby terminates the motor vehicle toward the outside. Furthermore the body structure comprises at least one seat mounting for securing a motor vehicle seat. It is provided that on its outer side, the floor panel is free from corrugations or stiffening structures running predominantly in the transverse direction of the motor vehicle.

Predominantly in the transverse direction of the motor vehicle means in this context that no corrugations or stiffening structures are provided whose angle to the transverse direction of the motor vehicle is less than approximately 45°. A body structure can be provided that is at least streamlined toward the motor vehicle exterior or even completely smooth. In this way, the air resistance of a correspondingly fitted motor vehicle can be reduced and noise due to wind excitations at corrugations or stiffening structures can be reduced.

According to an embodiment, it can be provided that the floor panel has a connection to a front wall, to a heel plate, to a side skirt, and/or to a central tunnel. It is feasible that the floor panel is configured in one piece with a heel plate or front wall or corresponding heel plate or front wall sections, in a particular embodiment, however, a connection is provided for this purpose. In this way, the body structure gives an easy to handle assembly unit.

According to an embodiment, it can be provided that the connection of the floor panel to the side skirt and/or to the central tunnel is configured as a hollow profile. Hollow profiles are particularly stiff and thereby contribute to a further stiffening of the body, which in particular has the advantage that outer forces introduced into the motor vehicle can be guided better around the passenger cabin.

According to another embodiment, it can be provided that the seat mounting comprises a seat rest disposed adjacently to the connection to the side skirt and/or one disposed adjacently to the connection to the central tunnel. The variability of the body structure can be increased by means of such a separately designed seat mounting since more identical parts can be used for different types of motor vehicles constructed on the same platform. By using correspondingly configured different seat rests, which can, for example, have different heights, an otherwise largely identical body structure can be used, in which merely different seat rests need to be used.

According to another embodiment, it can be provided that a cross member is disposed in the area of the seat rest or seat rests. With the aid of such a cross member, the body stiffness in the transverse direction of the vehicle can be increased and the floor panel further stiffened so that this can be less excited to vibrate.

According to another embodiment, it can be provided that the cross member is fastened to the seat rest or the seat rests. In this way, a particularly stiff body structure is obtained in the area of the motor vehicle seats, which guides forces introduced into the motor vehicle from outside effectively around the occupants.

According to another embodiment, it can be provided that the cross member runs obliquely to the vehicle longitudinal direction. In this way, the packing space for further installations of the motor vehicle can be optimized and external forces can be led off into a rear area of the motor vehicle.

According to another embodiment, it can be provided that a longitudinal reinforcement is disposed on the inner side of the floor panel. By disposing the longitudinal reinforcement on the inner side of the floor panel, the outer side of the floor panel can be configured to be particularly smooth so that the air resistance of the motor vehicle can be further reduced.

According to another embodiment, it can be provided that the longitudinal reinforcement is supported on the cross member. The force flow of external forces introduced into the body and of driving dynamic forces can thus be guided particularly efficiently through the body and further increase the body stiffness.

In another embodiment, it can be provided that the floor panel is produced by roll forming or folding. A floor panel produced in such a manner can, on the one hand, be manufactured cost-effectively and on the other hand, with low tolerances so that assembly of such a body structure can be simplified.

A motor vehicle is provided that has a body structure according to the previously described embodiments. Such a motor vehicle combines a low air resistance with high body resistance and large available passenger compartment.

A method is also provided for manufacturing a body structure of a motor vehicle, in particular a body structure according to the previously described embodiment, comprising the following process steps: providing a floor panel, connecting a cross member to seat rests, and arranging the cross member—seat rest unit on an inner side of the floor panel and connecting to this. The body structure can be fabricated particularly simply with the aid of this method since cross members and seat rests can be interconnected before these are mounted on an inner side of the floor panel. The connection to the floor panel can be made by the usual methods, for example, screwing, welding, riveting, and the like. Furthermore, a particularly high stiffness of the body structure can be achieved in this way since cross members and seat rests form a structural unit.

According to an embodiment of the method, it can be provided that a longitudinal reinforcement is disposed on the inner side of the floor panel and connected to this. In this way, the outer side of the floor panel can be kept free from such reinforcements and the aerodynamics and the noise behavior of the body structure can be optimized.

In another embodiment, it can be provided that the longitudinal reinforcement is connected to the cross member. This further increases the stiffness of a body structure produced according to this method.

According to another embodiment of the method, the floor panel is roll-formed or folded. This enables a particularly simple forming of the floor panel in the required shape.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
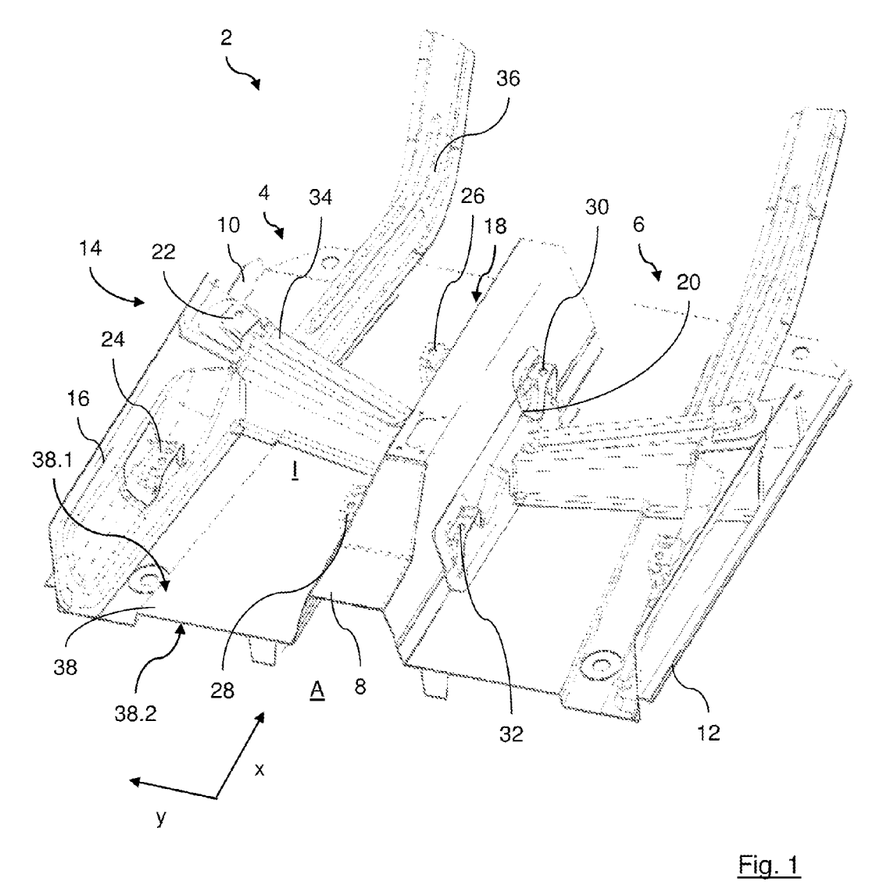
FIG. 1 shows a perspective view of a body structure according to an embodiment of the invention with two floor panels.

FIG. 1 shows a sectional perspective view of a floor structure 2, comprising two body structures 4, 6. The body structures 4, 6 are connected to the floor structure 2 shown by means of a central tunnel 8 as well as side skirts 10, 12 and further components. The vehicle longitudinal direction is characterized by x, the vehicle transverse direction by y. The description from here is provided with reference to the left body structure 4, with the structure on the right side being repeated as a mirror image.

The body structure 4 comprises a seat mounting 14. The seat mounting 14 comprises an external disposed seat rest 16 and an internally disposed seat rest 18, which is concealed in FIG. 1, but corresponds to the seat rest 20 as a mirror image. The seat rests 16, 18, 20 each have seat connections 22, 24, 26, 28, 30, 32. The seats are fastened to the seat connections 22 to 32 by means of seat rails not shown in FIG. 1.

A cross member 34, which is configured to form a hollow profile, extends between the outer seat rest 16 and the inner seat rest 18. The cross member 34 is disposed obliquely to the vehicle longitudinal direction (direction of travel) x and obliquely to the vehicle transverse direction y. The cross member 34 is fastened to the seat rests 16 and 18. A longitudinal reinforcement 36 is disposed in the area of the vehicle longitudinal direction x in front of the cross member 34, which abuts with its front side against the cross member 34.

The floor of the body structure 4 is implemented by a roll-formed floor panel 38, which separates an inner space I from an outer space A. The floor panel 38 is connected on the outside to the side skirt 10 in the vehicle transverse direction y and on the inside to the central tunnel 8 in the vehicle transverse direction y.

The seat rests 16, 18, the cross member 34, and the longitudinal reinforcement 36 are disposed on an inner side 38.1 of the floor panel 38 and connected to the floor panel 38. Seat rests 16, 18, central tunnel 8, side skirts 10, cross member 34, as well as longitudinal reinforcement 36 can in particular be welded to the floor panel 38 for connection.

Figure 2:
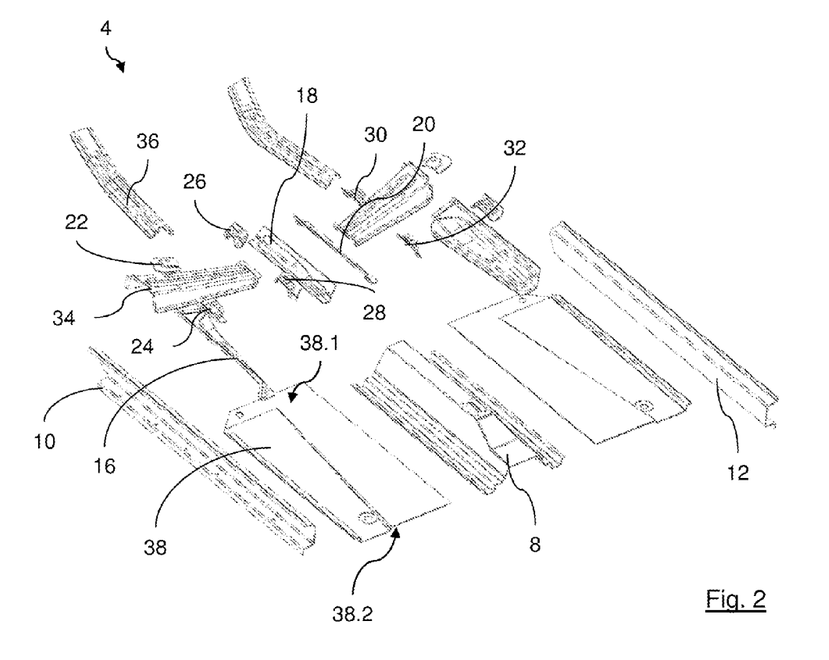
FIG. 2 shows a perspective exploded view of the components of the body structure according to an embodiment of the invention.

FIG. 2 shows a perspective exploded view of the components of the floor structure 2. All the components shown can be produced by forming methods such as roll forming, folding or deep drawing and can then be assembled to the floor structure 2 and connected. In particular, the seat rests 16 and 18 can be connected together with the cross member 34 to form a unit, which can then be assembled as a seat rest—cross member unit to form the body structure 4. In this way, a high stability of the seat rest—cross member unit is ensured, so that the motor vehicle is very rigid in the area of the vehicle seat. The floor panel 38 is formed so that it can be manufactured by roll forming or folding and that it is kept free from corrugations or stiffening structures toward its outer side 38.2, which run predominantly in the vehicle transverse direction.

Figure 3:
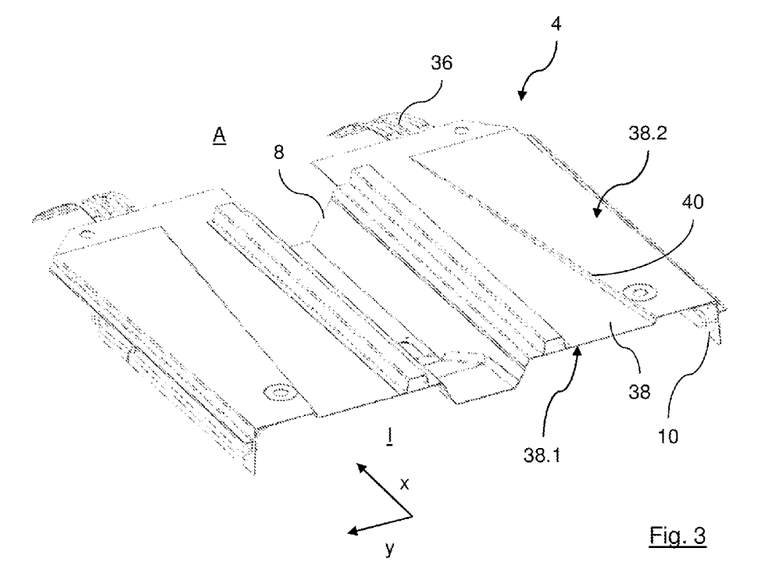
FIG. 3 shows a view of the body structure according to an embodiment of the invention from below.

FIG. 3 shows a view of the floor structure 2 turned upside down, so that the outer space A above the inner space I below can be seen. The outer side 38.2 of the floor panel 38 is free from corrugations or stiffening structures running predominantly in the vehicle transverse direction y. Merely a beading 40 running predominantly in the vehicle longitudinal direction x is provided for stiffening the floor panel 38 and for creating packing volumes.

Figure 4:
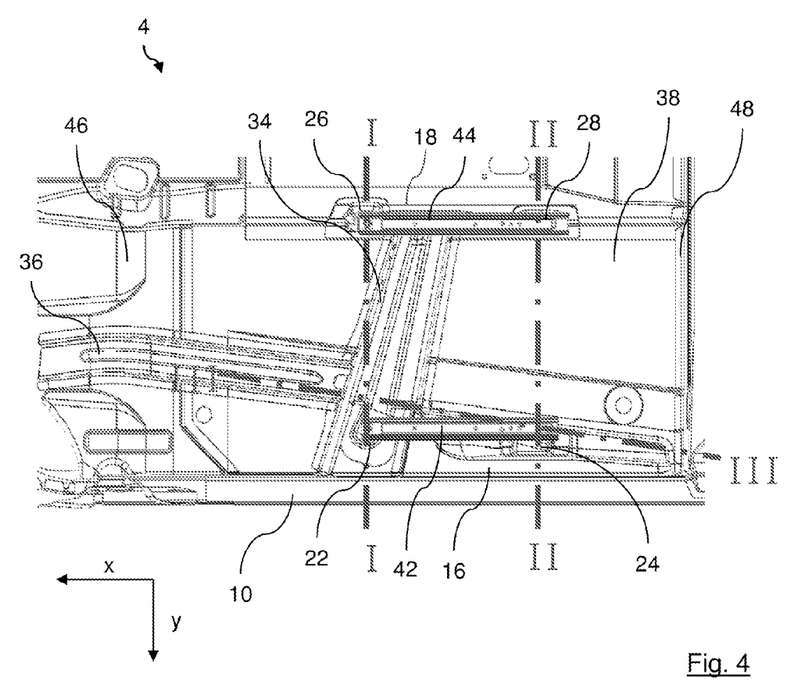
FIG. 4 shows a plan view of the body structure according to an embodiment of the invention.

FIG. 4 shows a plan view of the floor structure 4. Seat rails 42, 44 are disposed on the seat connections 22 to 28, on which a motor vehicle seat can be fastened adjustably. The floor panel 38 is connected to a front wall 46 toward the front and to a heel plate 48 toward the back. The connections of the floor panel 38 to front wall 46 and heel plate 48 can be made by means of welding. The longitudinal reinforcement 36 extends in the vehicle longitudinal direction x, as can also be seen in FIG. 1, FIG. 2 and FIG. 3, beyond the floor panel 38 to the front wall 46, and is connected structurally to this, to further increase the stiffness of the floor structure 2.

Cross member 34 and longitudinal reinforcement 36 are each disposed obliquely to the vehicle principal axes x, y and also obliquely to one another. The oblique arrangement of cross member 34 and longitudinal reinforcement 36 with respect to the vehicle principal axes and with respect to one another increases the usage stiffness of the motor vehicle since a twisting of extensive structures can be effectively prevented by the oblique arrangement. The lines of intersection I-I, II-II and III-III shown in FIG. 4 are explained in the following FIG. 5 to FIG. 7.

Figure 5:
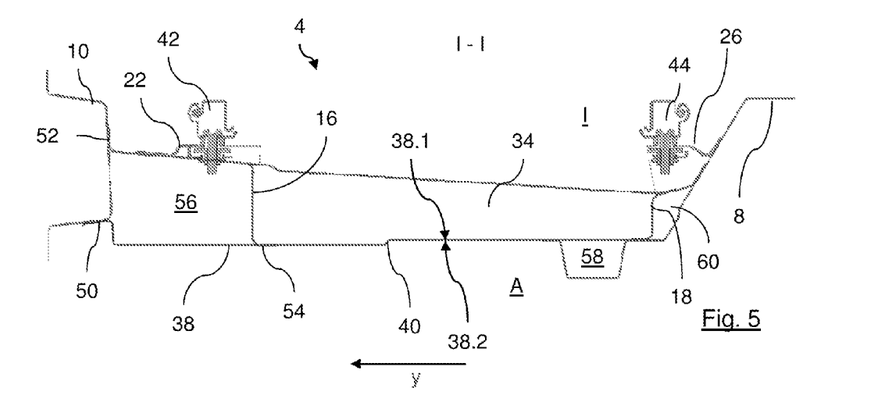
FIG. 5 shows a cross-section through the body structure according to an embodiment of the invention along the line of intersection I-I according to FIG. 4.

The cross-section I-I shown in FIG. 5 is shown viewed in the vehicle longitudinal direction x. The floor panel 38 is connected to the side skirt 10 at a fixing point 50. The seat rest 16 is connected on the one hand to the side skirt 10 at a fixing point 52 and on the other hand to the floor panel 38 at a fixing point 54. In the exemplary embodiment shown, the connections are made by welding.

Due to the shape of the seat rest 16, a cavity 56 is formed adjacent to the side skirt 10, which contributes toward a stiffening of the body structure 4. Toward the vehicle center, the floor panel 38 and the central tunnel 8 are formed in such a manner that further stiffening cavities 58, 60 are formed, the cavity 58 on the outer side 38.2 of the floor panel 38, the cavity 60 on the inner side 38.1 of the floor panel 38. The seat rails 42, 44 are screwed to the seat connections 22, 26. The cross member 34 is connected structurally both to the seat rest 16 and also to the seat rest 18 and is also fixed on the floor panel 38.

Figure 6:
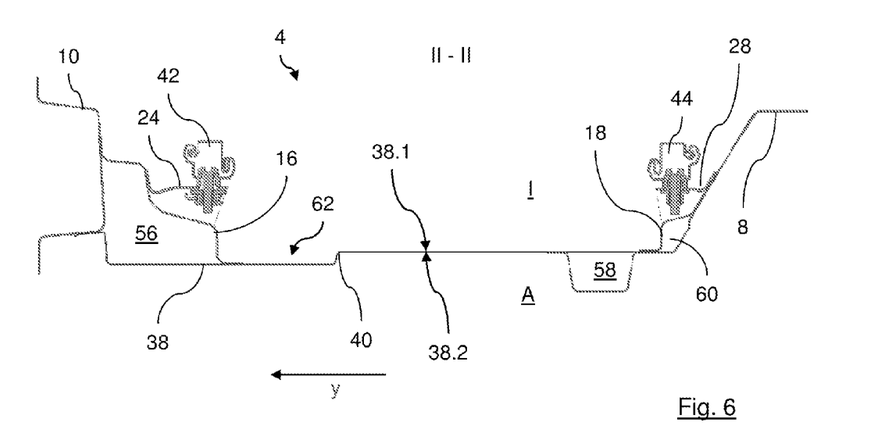
FIG. 6 shows a cross-section through the body structure according to an embodiment of the invention along the line of intersection II-II according to FIG. 4.

The section II-II according to FIG. 6 is also shown viewed in the vehicle longitudinal direction x and is disposed somewhat further back in the motor vehicle than the section I-I according to FIG. 5. In this area the seat rest 16 is less voluminous in order to be able to provide as much foot space as possible for the passengers sitting in the back. This is achieved by an indentation of the seat rest 16. Thanks to the beading 40, the floor panel 38 has an indentation 62, which can serve as packing space for various fixtures of the motor vehicle, for example, cables, lines, and similar. The seat rails 42, 44 are fixed on the seat connections 24, 28.

Figure 7:
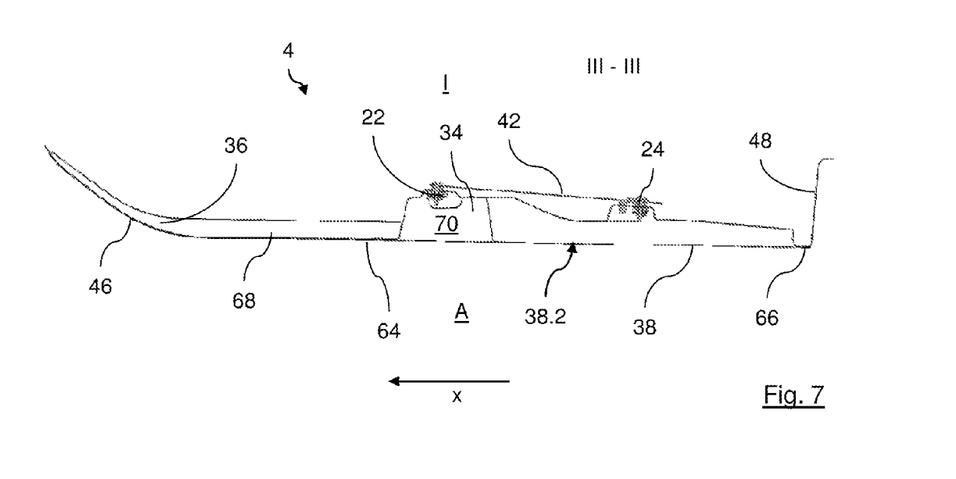
FIG. 7 shows an oblique section through the body structure according to an embodiment of the invention along the line of intersection III-III according to FIG. 4.

FIG. 7 shows the section III-III according to FIG. 4, which is placed substantially parallel to the longitudinal reinforcement 36 and looks in the direction of the vehicle interior. The floor panel 38 is connected to the front wall 46 at fixing points 64, 66 on the one hand and to the heel plate 48 on the other hand. It can be clearly seen in this section that the motor vehicle structure 4 according to the invention on the outer side 38.2 of the floor panel 38 is free from indentations and corrugations running predominantly in the vehicle transverse direction y. The longitudinal reinforcement 36 forms a cavity 68 with the front wall 46 and the floor panel 38, and the cross member 34 forms a cavity 70 with the floor panel 38. The seat rail 42 is disposed slightly sloping, whereby tall drivers who sit further back can be provided with a larger head room.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body structure of a motor vehicle, comprising:
    a floor panel having an inner side directed toward an interior of the motor vehicle and an outer side directed toward an exterior of the motor vehicle exterior;
    a side skirt connected to the floor panel;
    a central tunnel connected to the floor panel;
    a first seat rest connected to a side wall of the side skirt and supporting first and second seat connections;
    a second seat rest connected to the inner side of the floor panel and opposing the first seat rest along a transverse direction of the motor vehicle;
    a cross member including a first end connected to a top side of the first seat rest and including a second end connected to the second seat rest, and a lower side of the cross member connected to the floor panel; and
    a longitudinal reinforcement supported on the cross member between the first seat rest and the second seat rest, and
    wherein the first and second seat rests are configured to secure a motor vehicle seat, and
    wherein the floor panel is free from structures that run predominantly in a transverse direction of the motor vehicle on the outer side of the floor panel.

2. The body structure according to claim 1, wherein the structures running predominantly in the transverse direction of the motor vehicle are corrugations.

3. The body structure according to claim 1, further comprising a connection configured to connect the floor panel to a front wall.

4. The body structure according to claim 3, wherein the connection is a hollow profile.

5. The body structure according to claim 1, wherein the cross member is fastened to the seat rest and forms a cavity with the floor panel.

6. The body structure according to claim 1, wherein the cross member is configured to run obliquely to a longitudinal direction of the motor vehicle.

7. The body structure according to claim 1, wherein the longitudinal reinforcement is disposed on the inner side of the floor panel between the side skirt and the central tunnel and is configured to run obliquely to principal axes of the motor vehicle and to run obliquely to the cross member.

8. The body structure according to claim 7, wherein the longitudinal reinforcement is supported on the cross member and is configured to run obliquely to a longitudinal direction of the motor vehicle.

9. The body structure according to claim 1, wherein the floor panel is produced by roll forming.

10. A method for manufacturing a body structure of a motor vehicle, comprising:
    providing a floor panel,
    connecting a cross member to a top side of a first seat rest supporting first and second seat connections;
    connecting the cross member to a second seat rest;
    arranging the cross member and the seat rest that form a unit on an inner side of the floor panel;
    connecting the floor panel to a lower side of the cross member on the inner side of the floor panel;
    connecting the first seat rest to a side wall of a side skirt and the second seat rest to the floor panel; and connecting a longitudinal reinforcement to be supported on the cross member between the first seat rest and the second seat rest.

11. The method according to claim 10, wherein connecting the longitudinal reinforcement further comprises connecting the longitudinal reinforcement that is disposed on the inner side of the floor panel to run obliquely to principal axes of the motor vehicle and to run obliquely to the cross member.

12. The method according to claim 11, further comprising connecting the longitudinal reinforcement to the cross member.

13. The method according to claim 10, further comprising roll-forming the floor panel.

14. The method according to claim 10, further comprising roll-folding the floor panel.

15. The method according to claim 10, wherein connecting the cross member further includes connecting the cross member to the first seat rest aligned with a first of the seat connections of the first seat rest and connecting the cross member to a second seat rest between a first and a second seat connection of the second seat rest.

16. The body structure according to claim 1, wherein the first seat rest includes the first seat connection and the second seat connection that are separated along a longitudinal direction of the motor vehicle, and
wherein the second seat rest includes a first seat connection and a second seat connection that are separated along the longitudinal direction of the motor vehicle, and
wherein the first end of the cross member is aligned with the first seat connection of the first seat rest along the longitudinal direction of the motor vehicle and the second end of the cross member is connected to the second seat rest between the first and second seat connections of the second seat rest.

17. The body structure according to claim 1, wherein the longitudinal reinforcement includes a first end that terminates at and abuts against a front side of the cross member.

18. The method according to claim 10, wherein connecting a longitudinal reinforcement includes connecting a first end of the longitudinal reinforcement to terminate at and abut a front side of the cross member.

* * * * *